United States Patent [19]

Anderson et al.

[11] Patent Number: 5,369,231
[45] Date of Patent: * Nov. 29, 1994

[54] QUICK-RESPONSE ACCELEROMETER WITH INCREASED CONTACT DWELL TIME

[75] Inventors: Steven J. Anderson, Willis; Leonard W. Behr, Pontiac, both of Mich.

[73] Assignee: Automotive Systems Laboratory, Inc.

[ * ] Notice: The portion of the term of this patent subsequent to Sep. 22, 2009 has been disclaimed.

[21] Appl. No.: 949,786

[22] Filed: Sep. 22, 1992

Related U.S. Application Data

[63] Continuation-in-part of Ser. No. 577,485, Sep. 5, 1990, Pat. No. 5,149,925.

[51] Int. Cl.$^5$ .................... G01P 15/135; H01H 35/14
[52] U.S. Cl. .......................... 200/61.45 M; 200/61.53
[58] Field of Search ................. 200/61.45 M, 61.45 R, 200/61.52, 61.53

[56] References Cited

U.S. PATENT DOCUMENTS

| | | | |
|---|---|---|---|
| 4,933,515 | 6/1990 | Behr et al. | 200/61.45 M |
| 5,149,925 | 9/1992 | Behr et al. | 200/61.45 M |

*Primary Examiner*—A. D. Pellinen
*Assistant Examiner*—Michael A. Friedhofer
*Attorney, Agent, or Firm*—Lyman R. Lyon

[57] ABSTRACT

An acceleration sensor comprises a tube formed of an electrically-conductive, nonmagnetic material; an annular magnetically-permeable element, such as a iron washer, encircling a longitudinal portion of the tube; a magnetic sensing mass in the tube which magnetically interacts with the washer so as to be magnetically biased towards a first or "rest" position in the tube characterized in that a longitudinal portion of the sensing mass is situated within the portion of the tube encircled by the washer, the sensing mass being displaced from its rest position in the tube towards a second position therein in response to an accelerating force exceeding the magnetic bias thereon; and a switch operated by the sensing mass when the sensing mass is displaced to its second position in the tube. The instant accelerometer features a low threshold magnetic bias of the sensing mass of perhaps a fraction of 1 g to provide a quickened sensing mass response to acceleration inputs of short duration; whereafter the magnetic bias increases so as to peak when the sensing mass is displaced to a position within the passage intermediate its first and second positions therein, and thereafter decreases to a value equal to or slightly greater than 0.8 gs to maximize switch contact dwell time.

8 Claims, 1 Drawing Sheet

QUICK-RESPONSE ACCELEROMETER WITH INCREASED CONTACT DWELL TIME

CROSS-REFERENCE TO RELATED APPLICATIONS

The instant application is a continuation-in-part of U.S. Pat. application Ser. No. 07/577,485, U.S. Pat. No. 5,149,925 filed Sep. 5, 1990, and entitled "Quick Response Accelerometer."

BACKGROUND OF THE INVENTION

The instant invention relates to acceleration sensors, or accelerometers, for sensing the acceleration experienced by an object, such as a motor vehicle.

The prior art teaches magnetically-biased accelerometers comprising a housing having an inertial or sensing mass within a cylindrical passage therein which is magnetically biased towards a first end of the passage. Such prior art accelerometers provide a maximum magnetic bias on the sensing mass when the sensing mass is in its "rest" position proximate the first end of the passage. When the housing is subjected to an accelerating force which exceeds this maximum or "threshold" magnetic bias, the sensing mass is displaced within the passage from its rest position therein towards a second position at the other end of the passage. Such displacement of the sensing mass may further be retarded as by using either gas or electromagnetic damping, as taught in U.S. Pat. No. 4,329,549 to Breed, and U.S. Pat. No. 4,873,401 to Behr, respectively. If the acceleration input is of sufficient amplitude and duration, the sensing mass is displaced to the second end of the passage, whereupon the sensing mass operates suitable switch means in the sensor, as by bridging a pair of electrical contacts projecting into the passage at the second end thereof.

Unfortunately, the threshold magnetic bias typically employed by such prior art magnetically-biased accelerometers, i.e., the magnetic bias on the sensing mass thereof when the sensing mass is in its rest position, is equivalent to between about 2 gs to about 8 gs of acceleration. Thus, in the event of a vehicle acceleration (deceleration) of relatively short duration, such as in a 30 mph frontal barrier crash, the high threshold magnetic bias on the sensing mass delays the motion thereof considerably, with the sensing mass ultimately requiring perhaps 20 ms to traverse the length of the passage to operate the switch means of the accelerometer.

SUMMARY OF THE INVENTION

It is the object of the instant invention to provide a magnetically-biased accelerometer featuring a quicker response to short-duration acceleration inputs than is available with known accelerometers.

A further object of the instant invention is to provide such an accelerometer featuring increased contact dwell time.

The improved accelerometer of the instant invention comprises a housing having a cylindrical passage formed therein; an annular magnetically-permeable element, such as an iron or steel washer, secured to the housing in concentricity with the passage so as to encircle a longitudinal portion thereof; and a cylindrical magnetic sensing mass located within the passage and magnetically-interacting with the washer so as to be magnetically biased towards a first position within the passage, the first or "rest" position being characterized in that a longitudinal portion of the sensing mass is situated within the portion of the passage encircled by the washer, with the sensing mass being displaced from its first position within the passage towards a second position therein in response to an accelerating force exceeding the magnetic bias thereon.

The instant accelerometer further comprises switch means on the housing responsive to the sensing mass when the sensing mass moves to the second position within the passage. For example, in the preferred embodiment of the instant accelerometer, the switch means comprises a pair of electrical contacts which project into the passage for engagement with an electrically-conductive surface of the sensing mass upon displacement of the sensing mass to its second position within the passage.

The instant accelerometer preferably also includes damping means for retarding the displacement of the sensing mass within the passage. In the preferred embodiment, the damping means comprises an electrically-conductive, nonmagnetic ring or tube which encompasses the passage and magnetically interacts with the sensing mass upon the displacement thereof to provide distance between the first and second positions of the sensing mass within the passage (alternately expressed as the "stroke" of the passage), and the relative distance from the washer to the switch contacts is preferably also adjusted so as to achieve a magnetic return bias which first increases as the sensing mass is displaced from its first position in the passage, peaks at a point intermediate the sensing mass's first and second positions within the passage, and thereafter decreases as the sensing mass approaches its second position within the passage.

In operation, the magnetic interaction between the sensing mass and the washer of the instant accelerometer generates a magnetic bias on the sensing mass which begins to increase as the sensing mass is displaced from its first or "rest" position within the annulus of the washer towards its second position against the switch contacts. Significantly, under the instant invention, the "threshold" magnetic bias on the sensing mass is only a fraction of 1 g. Thus, when the housing experiences an acceleration input of relatively short duration, as might be encountered in the above-mentioned 30 mph vehicle frontal barrier crash, this small threshold magnetic bias on the sensing mass will be overcome, and the sensing mass will rapidly begin to be displaced towards the switch contacts. As the sensing mass is increasingly displaced from its rest position within the annulus of the washer, the magnetic bias on the sensing mass increases to ultimately peak when the sensing mass reaches a position within the passage intermediate its first and second electromagnetic damping therefor. In this regard, it is noted that the damping ring may encircle the portion of the housing defining the passage, or, as in the preferred embodiment, the inner surface of the damping ring may itself define a portion of the passage. The displacement of the sensing mass within the passage induces electric currents in the damping ring which flow substantially circumferentially therein and which vary proportionally with the rate of sensing mass displacement relative thereto and the distance of the sensing mass therefrom. The electric current thus induced in each affected portion of the damping ring in turn generates a magnetic field which interacts with the sensing mass to retard further displacement thereof.

In accordance with the instant invention at least one of the group consisting of the magnetic strength of the sensing mass, the dimensions and/or material of the washer, and the relative location of the first or rest position of the sensing mass within the annulus of the washer, i.e., the amount by which the longitudinal portion of the sensing mass is situated within the annulus of the washer when the sensing mass is in its first position within the passage, is adjusted so as to achieve a nominal initial magnetic return bias on the sensing mass which is less than about 1 g, and most preferably in the range of about 0.1 gs to about 0.5 gs. At least one of the group consisting of the relative magnetic strength of the sensing mass, the dimension and/or material of the washer, the relative positions therein, whereafter the magnetic bias on the sensing mass begins to decrease with additional displacement of the sensing mass towards its second position, with the magnetic bias continuing to diminish until the sensing mass engages the switch contacts.

DETAILED DESCRIPTION OF THE PREFERRED EMBODIMENTS OF THE INVENTION

Figure 1:
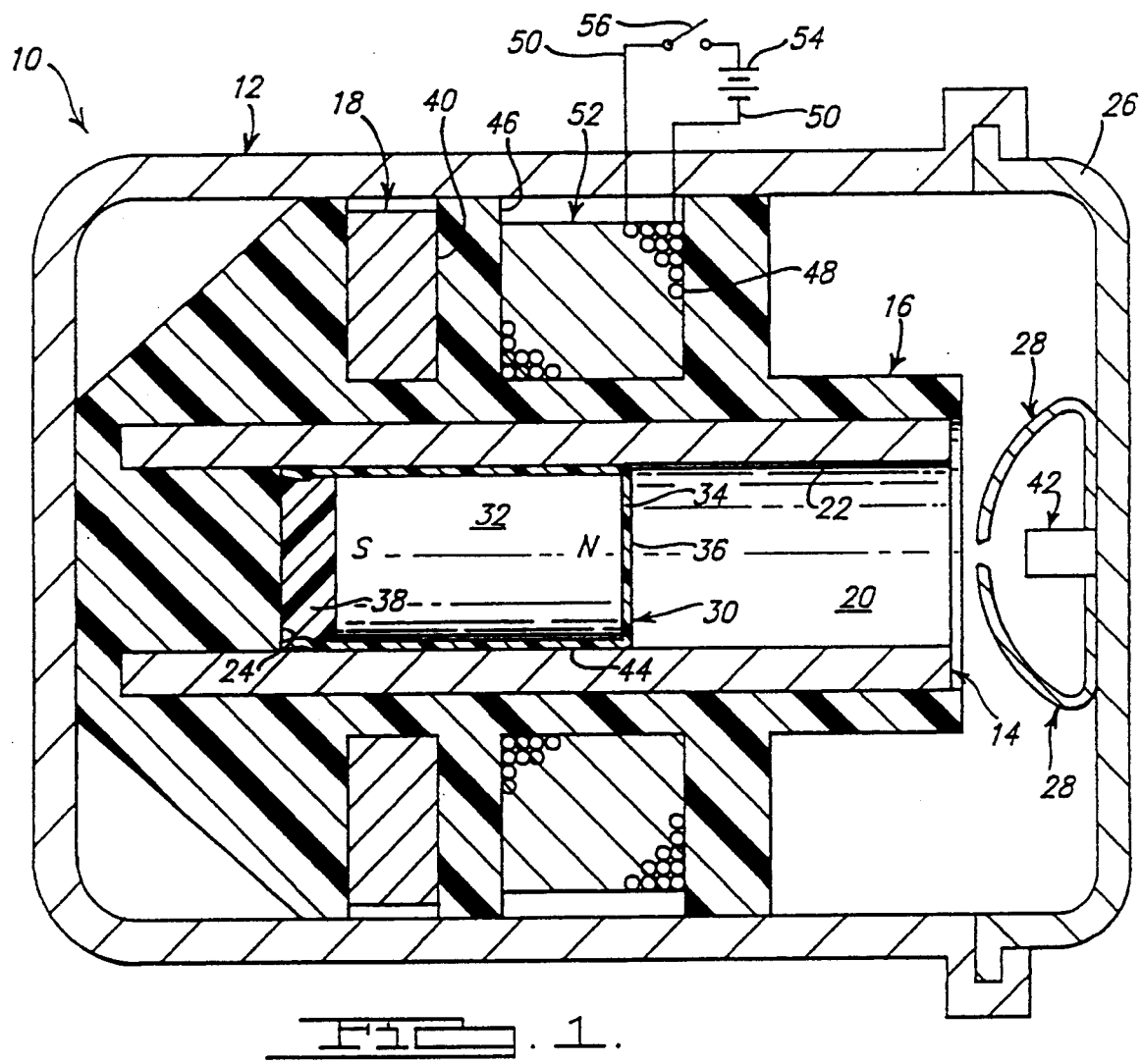
FIG. 1 is a longitudinal view in cross-section of an improved accelerometer constructed in accordance with the instant invention showing the magnetic sensing mass thereof in its first or "rest" position within the passage.

A vehicle accelerometer 10 constructed in accordance with the instant invention is illustrated in FIG. 1. An iron or steel housing 12 houses a tube 14 formed of an electrically-conductive, nonmagnetic material such as copper which is supported with respect thereto as by an encapsulating sleeve 16. The sleeve 16, which is preferably formed of an electrically-insulative material such as plastic and is conveniently molded about the tube 14, further supports an annular, magnetically-permeable element, such as an iron or steel washer 18, which encircles a longitudinal portion of the tube 14. It is noted that, in the preferred embodiment, the washer 18 is placed proximate to, but electrically isolated from, the copper tube 14 to prevent galvanic corrosion.

A right circular cylindrical passage 20 is thus defined within the housing 12 by the inner surface 22 of the tube 14. The first end 24 of the passage 20 is in turn defined by a stationary stop which may conveniently comprise a portion of the molded plastic sleeve 16. Significantly, the first end 24 of the passage 20 is positioned relative to the washer 18 so as to provide a longitudinal portion of the passage 20 which is encircled by the washer 18.

A pair of electrical contacts 28 are mounted on the cap 26 so as to project across the open end of the tube 14. The housing 12 is preferably sealed upon attachment of the cap 26 thereto during final assembly as by interlocking peripheral flanges thereon, respectively, in order to prevent the infiltration of moisture and other contaminants thereinto.

A magnetic sensing mass 30 in the tube 14 comprises a substantially cylindrical permanent magnet 32 formed of a material, such as samarium-cobalt, capable of providing a relatively high flux density which remains relatively unaffected by changes in temperature over the desired operating range of the instant accelerometer 10. In order to accommodate the frangible nature of many such high-strength magnets, the magnet 32 may be encapsulated in an enveloping structure comprising, for example, an extruded cup 34 formed of a nonmagnetic material such as copper or brass, the thickness of which has been exaggerated in FIG. 1 to facilitate the illustration thereof. Most conveniently, the open end of the thin-walled cup 34 is initially plugged with plastic cap 38 and then circumferentially crimped to securely encapsulate the magnet 32. The bottom surface 36 of the cup 34 is preferably gold-plated for improved electrical conductivity and greater corrosion resistance.

The tube 14 also provides electromagnetic damping for the sensing mass 30 which varies in proportion to the rate of such displacement of the sensing mass 30. More specifically, the movement of the sensing mass 30 within the tube 14 induces circumferential currents therein which, in turn, generates a magnetic field which opposes further displacement of the sensing mass 30.

In operation, the sensing mass 30 magnetically interacts with the washer 18 so as to be magnetically biased towards a first position within the passage 20 against the first end 24 thereof, as shown in FIG. 1. Significantly, when the sensing mass 30 occupies its first or "rest" position within the passage 20, a longitudinal portion of the sensing mass 30 is situated within the longitudinal portion of the passage encircled by the washer 18, i.e., a longitudinal portion of the sensing mass 30 passes within the plane defined by the face 40 of the washer 18 so as to be at least partially encircled thereby.

Upon experiencing an accelerating force exceeding the threshold magnetic bias thereon, the sensing mass 30 begins to move from its rest position in the passage 20 towards a second position therein proximate to the open end of the tube 14. Specifically, the second position of the sensing mass 30 within the passage 20 is the position therein which results in the engagement of the gold-plated surface 36 of the sensing mass with the contacts 28, whereby the contacts 28 are electrically bridged by the sensing mass 30. A second stop 42 prevents the escape of the sensing mass 30 from the tube 14 and prevents deleterious over-flexing of the contacts 28 when the sensor is subjected to an extreme acceleration, or during a test of the sensor in the manner described hereinbelow.

Figure 2:
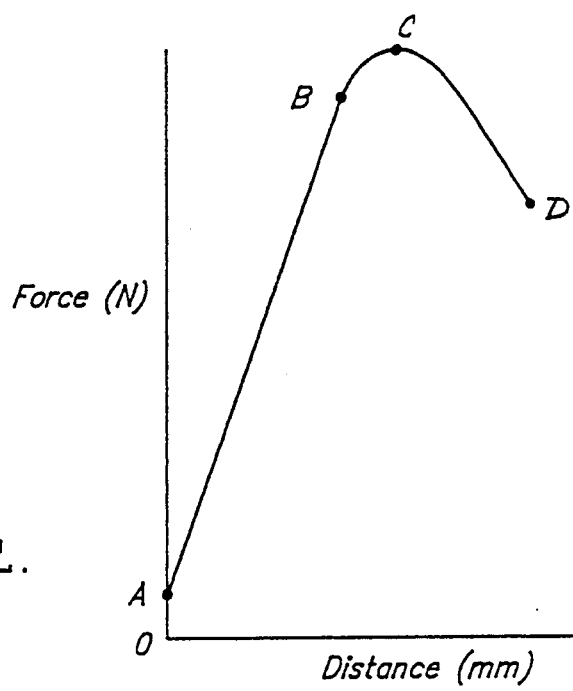
FIG. 2 is a plot of the magnetic biasing force on the sensing mass of the accelerometer of FIG. 1 as it travels through the passage from its rest position to its second position therein.

FIG. 2 shows the magnetic return bias on the sensing mass 30 as it travels from its rest position, represented by point A in FIG. 2, to its second position within the passage 20, represented by point D of FIG. 2. Specifically, the magnetic bias on the sensing mass 30 initially increases in a substantially linear manner as the sensing mass 30 is displaced from its rest position at point A to a first intermediate position within the passage 20, represented by point B of FIG. 2. The magnetic bias thereafter peaks at a second intermediate position within the passage 20, represented by point C of FIG. 2, whereafter the magnetic bias begins to decrease until the sensing mass 30 reaches its second position within the passage 20, represented by point D of FIG. 2. Thus, while the initial magnetic bias on the sensing mass 30 (point A) is relatively low to allow the sensing mass 30 to respond almost immediately to any acceleration input to the housing 12. The strength of the magnetic bias initially builds with sensing mass displacement so as to ultimately peak at the second intermediate position (point C), whereafter the magnetic bias begins to decrease as the sensing mass 30 approaches the switch contacts 28 (point D). The reduced magnetic bias exerted on the sensing mass 30 as it reaches its second position in the passage 20 in engagement with the switch contacts 28 provides increased contact dwell time, thereby ensuring proper vehicle safety restraint response to what otherwise might have been a particularly brief contact closure. Preferably, the inner surface 22 of the tube 14 or the radially-outer surface 44 of the sensing mass 30 is teflon-coated to reduce the sliding friction therebetween, thereby facilitating return of the sensing mass 30 to its rest position from any position in the passage 20 upon removal of the accelerating force, or upon termination of the test pulse as described below.

In the preferred embodiment of the instant accelerometer, the initial value for the magnetic return bias when the sensing mass 30 is in its first or rest position within the passage 20 (point A of FIG. 2) is less than perhaps about 1 g, and most preferably in the range of about 0.1 gs to about 0.5 gs; and the final value for the magnetic return bias when the sensing mass 30 reaches its second position within the passage 20 (point D of FIG. 2) is equal to or greater than about 0.8 g, and most preferably in the range of about 0.8 gs to about 2 gs. The peak value for the magnetic return bias (point C of FIG. 2) need only be slightly greater than its final value, although, in accordance with the instant invention, the peak value may be substantially greater than the final value.

A circumferential groove 46 in the molded plastic sleeve 16 provides a coil form about which an electrically-conductive wire 48 is wound. A pair of lead wires 50 extends through the housing 12 to facilitate the connection of the coil 52 with a battery 54 via a switch 56, as illustrated schematically in FIG. 1. The operability of the accelerometer 10 is tested by delivering a unidirectional current pulse through the coil 52. The resulting magnetic field magnetizes the washer 18, which in turn repels the sensing mass 30 to the second position within the passage 20. Upon reaching the second position, the electrically-conductive surface 36 of the sensing mass bridges the contacts 28, whereby full sensor function is confirmed.

It is noted that the sensor housing 12 and cap 26 are formed of iron or steel in order to isolate the sensing mass 30 from external electromagnetic fields and materials. And, while the housing may magnetically interact with the sensing mass so as to force it into engagement with the inner surface 22 of the tube 14, such engagement may nonetheless be preferable to the unpredictable effects on sensor response due to such external magnetic fields and materials. Moreover, the housing 12 may be asymmetrically positioned about the tube 14 so that the magnetic interaction between the housing 12 and the sensing mass 30 therein tends to counter the force of gravity on the latter, whereby the engagement between the sensing mass 30 and inner surface 22 of the tube 14 due to gravity is also minimized.

While the preferred embodiment of the invention has been disclosed, it should be appreciated that the invention is susceptible of modification without departing from the spirit of the invention or the scope of the subjoined claims.

We claim:

1. An accelerometer comprising:
   a housing having a cylindrical passage formed therein;
   an annular magnetically-permeable element secured to said housing so as to encircle a first longitudinal portion of the passage;
   a cylindrical magnetic sensing mass located within the passage, said sensing mass magnetically-interacting with said element so as to be magnetically biased towards a first position within the passage, said first position being characterized in that a longitudinal portion of said sensing mass is situated within said first portion of the passage, said sensing mass being displaced from said first position towards a second position within the passage in response to an accelerating force exceeding said magnetic bias, wherein said magnetic bias varies with displacement of said sensing mass, said magnetic bias being a first value when said sensing mass is in said first position, a second value when said in an intermediate position in said passage intermediate said first and second positions, and a third value when said sensing mass is in said second position, said second value being greater than said first value, and said third value being greater than said first value but less than said second value; and
   switch means on said housing responsive to said sensing mass when said sensing mass is displaced to said second position within the passage.

2. The accelerometer of claim 1 wherein said first value is less than about 1 g.

3. The accelerometer of claim 2 wherein said first value is in the range of about 0.1 gs to about 0.5 gs.

4. The accelerometer of claim 1 wherein said third value is greater than or equal to about 0.8 gs.

5. A method for calibrating the return bias force exerted on a sensing mass of an accelerometer, said accelerometer comprising:
   a housing having a cylindrical passage form therein;
   an annular magnetically-permeable element secured to said housing so as to encircle a first longitudinal portion of the passage;
   a cylindrical magnetic sensing mass located within the passage, said sensing mass magnetically-interacting with said element so as to be magnetically biased towards a first position within the passage, said first position being characterized in that a longitudinal portion of said sensing mass is situated within said first portion of the passage, said sensing mass being displaced from said first position towards a second position within the passage in response to an accelerating force exceeding said magnetic bias; and
   switch means on said housing responsive to said sensing mass when said sensing mass is displaced to said second position within the passage,
   said method including the step of:
      adjusting at least one of the group consisting of the magnetic strength of said sensing mass, the relative size of said first longitudinal portion of the passage encircled by said element, the dimensions of said element, and the magnetic permeability of said element such that said magnetic bias on said sensing mass has a value less than about 1 g when said sensing mass is in said first position.

6. The method of claim 5 further including the step of:
   adjusting at least one of the group consisting of the magnetic strength of said sensing mass, the dimensions of said element, the magnetic permeability of said element, the relative distance between said first and second positions of said sensing mass with the passage, and the minimum distance between said element and said sensing mass when said sensing mass is in said second position within the passage, said magnetic bias on said sensing mass being characterized in that said magnetic bias increases from a first value therefor when said sensing mass is in said first position to a second value therefor when said sensing mass reaches a third position within the passage intermediate said first and second positions, said magnetic bias thereafter decreasing with further sensing mass displacement from said third position toward said second position so as to diminish to a third value therefor, said third value for said magnetic bias being intermediate said first and second values therefor.

7. The method of claim 6 wherein said adjusting step increases contact dwell time.

8. The method of claim 7 wherein said second adjusting step provides a magnetic bias profile characterized in that said magnetic bias increases in a substantially linear manner as said sensing mass is displaced from said first position until said sensing mass reaches a fourth position within said passage intermediate said first and third positions.

* * * * *

UNITED STATES PATENT AND TRADEMARK OFFICE
CERTIFICATE OF CORRECTION

PATENT NO. : 5,369,231

DATED : November 29, 1994

INVENTOR(S) : Steven J. Anderson and Leonard W. Behr

It is certified that error appears in the above-identified patent and that said Letters Patent is hereby corrected as shown below:

Col. 2, line 23 after "to provide" insert
--electromagnetic damping therefor. In this regard, it is noted that the damping ring may encircle the portion of the housing defining the passage, or, as in the preferred embodiment, the inner surface of the damping ring may itself define a portion of the passage. The displacement of the sensing mass within the passage induces electric currents in the damping ring which flow substantially circumferentially therein and which vary proportionally with the rate of sensing mass displacement relative thereto and the distance of the sensing mass therefrom. The electric current thus induced in each affected portion of the damping ring in turn generates a magnetic field which interacts with the sensing mass to retard further displacement thereof.

In accordance with the instant invention at least one of the group consisting of the magnetic strength of the sensing mass, the dimensions and/or material of the washer, and the relative location of the first or rest position of the sensing mass within the annulus of the washer, i.e., the amount by which the longitudinal portion of the sensing mass is situated within the annulus of the washer when the sensing mass is in its first position within the passage, is adjusted so as to achieve a nominal initial magnetic return bias on the sensing mass which is less than about 1 g, and most preferably in the range of about 0.1 gs to about 0.5 gs. At least one of the group consisting of the relative magnetic strength of the sensing mass, the dimension and/or material of the washer, the relative--

Col. 2, line 55 after "first and second" delete
"electromagnetic damping therefor. In this regard, it is noted that the damping ring may encircle the portion of the housing defining the passage, or, as in the preferred embodiment, the inner surface of the damping ring may itself define a portion of the passage. The displacement of the sensing mass within the passage induces electric currents in the damping ring which flow substantially circumferentially therein and which vary proportionally with the rate of sensing mass displacement relative thereto and the distance of the sensing mass therefrom. The electric current thus induced in each affected portion of the damping ring in turn generates a magnetic field which interacts with the sensing mass to retard further displacement thereof.

UNITED STATES PATENT AND TRADEMARK OFFICE
CERTIFICATE OF CORRECTION

PATENT NO. : 5,369,231
DATED : November 29, 1994
INVENTOR(S) : Steven J. Anderson, et al.

It is certified that error appears in the above-indentified patent and that said Letters Patent is hereby corrected as shown below:

In accordance with the instant invention at least one of the group consisting of the magnetic strength of the sensing mass, the dimensions and/or material of the washer, and the relative location of the first or rest position of the sensing mass within the annulus of the washer, i.e., the amount by which the longitudinal portion of the sensing mass is situated within the annulus of the washer when the sensing mass is in its first position within the passage, is adjusted so as to achieve a nominal initial magnetic return bias on the sensing mass which is less than about 1 g, and most preferably in the range of about 0.1 gs to about 0.5 gs. At least one of the group consisting of the relative magnetic strength of the sensing mass, the dimension and/or material of the washer, the relative"

Signed and Sealed this

Fourteenth Day of February, 1995

Attest:

BRUCE LEHMAN

Attesting Officer      Commissioner of Patents and Trademarks